United States Patent [19]

Wheadon

[11] Patent Number: 5,001,022
[45] Date of Patent: Mar. 19, 1991

[54] NOVEL LEAD-ACID STORAGE BATTERY AND RELATED METHOD OF CONSTRUCTION

[75] Inventor: Ellis G. Wheadon, Bernville, Pa.

[73] Assignee: Cal-Tec Corp., Temple, Pa.

[21] Appl. No.: 443,742

[22] Filed: Nov. 30, 1989

[51] Int. Cl.$^5$ .......................................... H01M 10/14
[52] U.S. Cl. ...................................... 429/53; 429/94; 429/161
[58] Field of Search ............................. 429/161, 94, 53

[56] References Cited

U.S. PATENT DOCUMENTS

| | | | |
|---|---|---|---|
| 316,409 | 4/1885 | Shaw | 429/161 |
| 940,288 | 11/1909 | Tate | 429/161 |
| 1,369,931 | 3/1921 | McCreary | 429/161 |
| 3,904,433 | 9/1975 | Frazier | 429/94 |

Primary Examiner—Donald L. Walton
Attorney, Agent, or Firm—Reed Smith Shaw & McClay

[57] ABSTRACT

A lead acid cell having unitized positive and negative electrodes positioned within a container such that the respective edges of the positive electrode are spaced apart from the edges of negative electrode. The electrodes are each made up of at least one plate having a major surface with a composition thereon for imparting a negative or positive polarity. The plates of each electrode have first and second edges in which the second edges are connected to an associated current collector and the first edges of each electrode oppose each other in spaced apart relation.

24 Claims, 12 Drawing Sheets

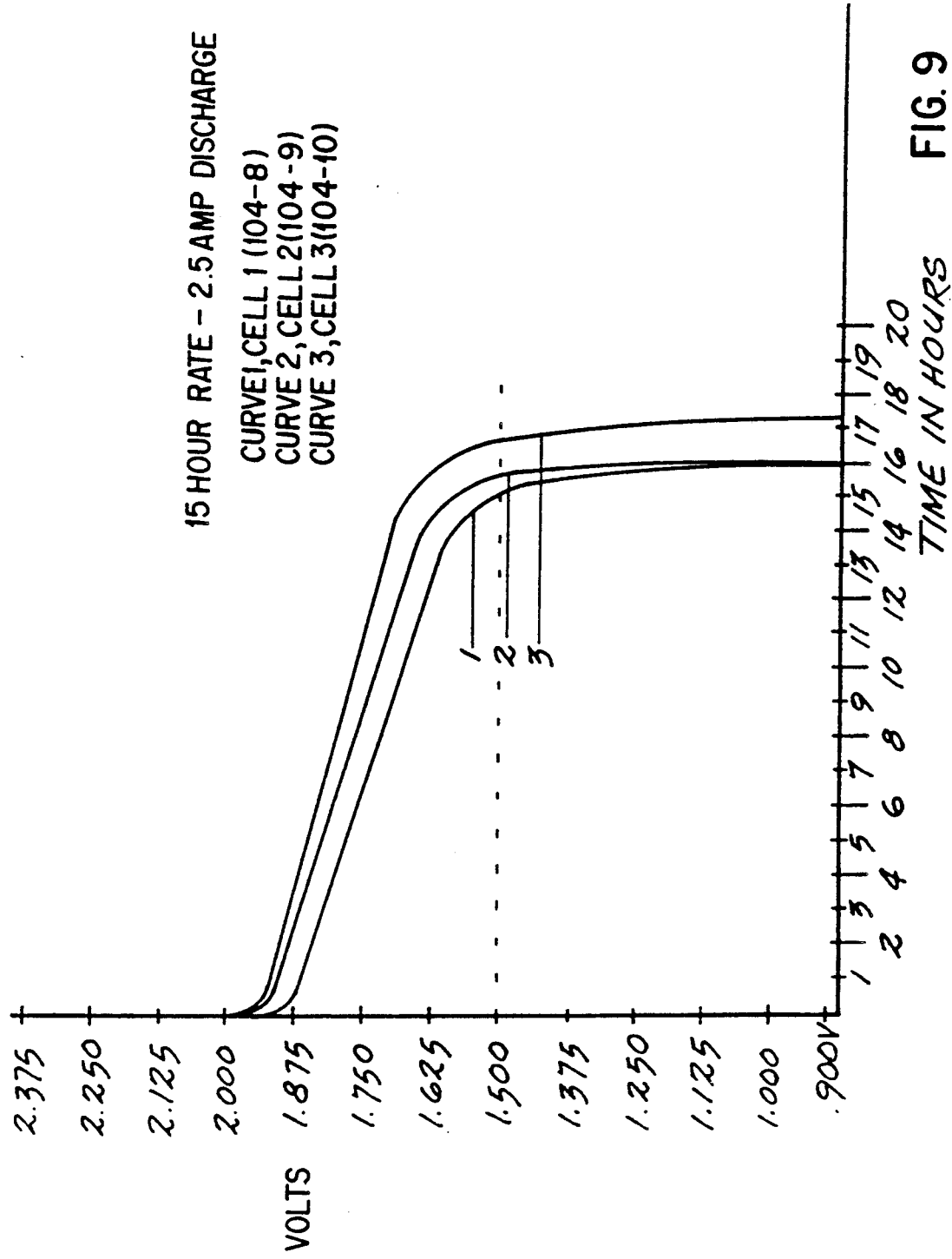

| Rate | Cell 1 (104-8) | | Cell 2 (104-9) | | Cell 3 (104-10) | |
|---|---|---|---|---|---|---|
| | AmpHr./# | WattHr./# | AmpHr./# | WattHr./# | AmpHr./# | WattHr./# |
| 5 Hr. | 34.20 | 43.89 | 39.30 | 55.00 | 43.90 | 62.42 |
| 10 Hr. | 40.50 | 57.18 | 40.80 | 61.35 | 44.20 | 71.41 |
| 15 Hr. | 40.25 | 62.72 | 40.25 | 64.53 | 42.70 | 74.35 |
| 20 Hr. | 37.50 | 66.53 | 41.20 | 74.20 | 43.60 | 78.18 |

FIG. 10

NOVEL LEAD-ACID STORAGE BATTERY AND RELATED METHOD OF CONSTRUCTION

FIELD OF THE INVENTION

This invention relates to an improved lead-acid battery and a novel method of manufacture therefore and, in particular, to a lead-acid battery in which a unitized positive electrode structure is positioned opposite to but spaced apart from a unitized negative electrode structure.

BACKGROUND OF THE INVENTION

Lead-acid batteries have long been used as a power source for automotive starting, vehicular traction, emergency lighting, powering portable tools and appliances, and standby power. Additionally, these batteries are believed to be useful in improving the economics of power generation via load levelling or peak power shaving (i.e., storage of power generated during off-peak hours to supplement that generated during times of peak demand). However, economic load-levelling storage batteries require large cells of high capacity, a long life in cycling service, high quality assurance and a minimum of maintenance. Also, economic recovery and recycling of the large quantity of raw materials involved is such batteries is highly desirable.

Lead-acid batteries suitable for load-levelling service are normally classified as either "flat-plate" or "tubular." In each case, the battery consists of a number of individual cells, each of which contains one or more positive electrodes and one or more negative electrodes which are immersed in a sulfuric acid electrolyte and electrically insulated from one another by an acid-resistant porous separator. All positive electrodes within a cell are electrically connected in parallel as are all negative electrodes within a cell. The capacity of each cell is controlled by the amount of positive and negative active material in the cell and by the number of electrodes and the length, width, and/or thickness of such electrodes. The rate at which a cell discharges is controlled by the surface area of the electrodes available for reaction and can be changed by varying the number of electrodes and/or the surface area of each electrode within a cell.

One method of increasing the surface area of battery electrodes, disclosed in U.S. patent application No. 315,722 is profiling the paste layer on each side of the electrode. An ideal deep-cycling storage battery is one in which both the amount of positive and negative active materials and the surface area of the positive and negative plates can be maximized within a given cell volume.

Typically, large flat-plate cells and batteries used in deep-cycle service, include positive and negative plates positioned such that each pasted positive plate side surface faces, and is oriented essentially parallel to, a pasted negative plate side surface of equivalent area. For the positive and negative plates, the preferred pastes are comprised of lead oxide, water, sulfuric acid and binder as the positive paste composition and lead oxide, water, sulfuric acid, binder and expander as the negative plate composition. The plates are normally separated from one another by one or more layers of porous electrically insulating materials, typically made from glass fibers and porous polymeric materials. In one such cell construction, described in U.S. Pat. No. 4,447,508, the positive plate is separated from the negative plate by three layers of insulating material, one of which is wrapped around the positive plate, and one layer of insulting retainer material. This type of battery involves both high labor cost and high material costs. Additionally, it is difficult to increase the capacity of flat-plate cycling batteries by increasing the size or number of plates because of plate growth, a prevalent cause of failure in prolonged cycle service.

In large tubular-type cells and batteries used for deep-cycle service, the positive electrodes normally consist of a one-piece cast lead conductor in the form of a series of parallel spines projecting downward from a single connecting strap, porous sleeves which are closed at the bottom and positioned relative to said spines in a manner which results in an annular space between said spine and said sleeve along the entire length of the spine, and loose positive active particulate material which is vibrated into the annular space. The negative electrode is normally of the pasted flat-plate type described above. It is typically positioned such that a sole pasted surface of the negative electrode faces and is parallel to a sole positive electrode surface of equivalent area, and spaced apart from the outer surface of the positive electrode by a porous polymeric ribbed sheet separator. As in the case of flat-plate cells, tubular-type cells consisting of a plurality of positive electrodes, a plurality of negative electrodes and a plurality of complex separators, are difficult to manufacture and inherently costly.

To overcome some of these problems, it is now possible to process lead-acid battery plate stock in continuous form. It is known that continuous grid casting, as described in U.S. Pat. Nos. 4,349,067 and 4,415,010, and continuous metal expansion, as described in U.S. Pat. No. 3,853,626, can be used to produce continuous lengths of battery grid stock which can be passed directly into a continuous pasting machine, such as that described in U.S. Pat. No. 4,271,586. The stock exiting the continuous paster is normally cut into individual grids, but it may be cured in coil from, as disclosed in pending U.S. patent application No. 315,722 and electrochemically formed prior to being divided into individual plats, as disclosed in pending U.S. patent application No. 361,029.

One cell construction utilizing pasted plate stock in continuous form is described in U.S. Pat. No. 3,862,861. It incorporates a continuous length of positive plate stock and a continuous length of negative plate stock positioned such that the pasted positive plate surface is opposite and parallel to the pasted negative plate surface and separated therefrom by continuous separator material. The cell is produced by coiling the aforesaid three-piece composite to form a "jelly-roll" structure which is then placed in a battery container.

A major problem inherent in both large flat plate batteries and a tubular batteries is stratification of the sulfuric acid electrolyte, i.e., the tendency for the electrolyte to separate into a layer of high specific gravity at the bottom of the cell and a layer of low specific gravity at the top of the cell. The high gravity layer at the bottom of the cell accelerates sulfation of the negative plate which reduces cell capacity, and the low gravity layer at the top of the cell increases the tendency towards corrosion of the positive grid which increases the electrical resistance in the cell and, eventually, results in failure of the plate. Acid stratification becomes more pronounced as the height of the cell increases.

One commonly used method to overcome acid stratification is bubbling air through the electrolyte; however, this is costly. Another commonly used method is overcharging the cell to generate gas which mixes the electrolyte, but this technique increases electrolyte loss and maintenance costs and shortens cell life.

Recombination of the gases generated during charging is also a widely used means of minimizing, or eliminating, electrolyte loss. One method of accomplishing such recombination in absorbed electrolyte cells containing flat vertical plate electrodes is described in U.S. Pat. Nos. 4,401,730 and 4,119,772 and involves the reaction of oxygen gas generated at the positive electrode with excess negative active material which is not covered by electrolyte. A similar approach is described in U.S. Pat. No. 4,425,412, which discloses a cell with improved deep-cycle capability based upon a plurality of horizontally disposed positive plates, a plurality of horizontally disposed negative plates, and free unabsorbed electrolyte, in which all active plate surfaces are submerged in electrolyte except the entire uppermost pasted surface of the top negative plate which is free to take part in the recombination reaction. The benefits obtained from the horizontal disposition of the battery plates described in U.S. Pat. No. 4,425,412, are limited to small cells, because in cells containing large plates, the movement of gas and electrolyte within the cell is restricted. Recombination can also be accomplished by the incorporation of a separate non-lead catalyst, as described in U.S. Pat. No. 3,470,024. Both the incorporation of excess negative active material and the use of separate catalysts, however, lower the cell efficiency.

Another factor which reduces the efficiency of large power cells is the increased electrical resistance resulting from the small size and off-center locations of the plate lugs which connect the battery plate to the external electrical contacts of the cell. As illustratively shown in U.S. Pat. Nos. 4,742,611 and 4,509,253, these plate lugs are situated towards one end of the plate and have a cross-sectional area parallel to the upper border of the plate that is normally less than 15% of the cross-sectional area of the upper border when that border is sectioned along the length of the battery plate. The off-center location and reduced cross-sectional area of the lug increases the length of the current-carrying path and, thus, the internal resistance of the cell.

A 2,000-volt, 10 megawatt lead-acid battery energy storage system has been developed utilizing 8,256 cells arranged in 8 parallel strings, each containing 1,032 cells connected in series. The battery includes provision to supply compressed air to each of the individual cells in order to circulate the electrolyte as a means of avoiding acid stratification. It also includes a 7,500-gallon water storage tank and distribution lines to each cell. In operation, the system requires 14 mandays of labor twice per year to water the cells, and utilizes approximately 2,000 tons of lead which must be recycled at the end of life.

While lead-acid storage batteries are suitable for deep-cycling service requirements, there are many limitations. Accordingly, it is an object of the present invention to provide an improved battery structure which reduces or eliminates many of the problems normally associated with the prior art lead-acid storage batteries.

SUMMARY OF THE INVENTION

Generally, the invention provides an electrochemical cell having a unitized positive electrode and a unitized negative electrode positioned so that the associated edges of the positive electrodes are oppositely spaced apart and electrically insulated from the associated edges of the negative electrodes.

Preferably, the electrochemical cell construction incorporates unitized electrodes positioned so that the positive electrode and the negative electrode are vertical juxtapositioned with the positive electrode located beneath the negative electrode. Preferably, each electrode contains (except for the end surfaces) at least two adjacent pasted surfaces separated by a narrow channel through which electrolyte can flow, and a substantial portion of one edge of each plate in the electrode is connected to an external electrical contact.

In one embodiment of the invention each electrode is constructed from a single length of battery plate stock in the form of a coil. In the preferred embodiments of the invention, it is possible to reduce or eliminate the need for incorporation of costly separators between the alternating positive and negative plate surfaces as in prior art cells. By placing the electrodes edge-to-edge, only a single insulator means is required.

The use of vertically aligned cells facilitates constructing batteries from two or more cells connected in series, in parallel, or any combination thereof. The invention further simplifies the means of electrically connecting these cells. In addition, such alignment increases the life of a lead-acid electrochemical cell by maintaining the positive electrode in an environment of higher gravity electrolyte and maintaining the negative electrode in an environment of lower gravity electrolyte.

Other advantages of the present invention will be more fully understood from a perusal of the following detailed description of the invention taken in connection with the appended drawings.

BRIEF DESCRIPTION OF THE DRAWINGS

FIGS. 9 and 10 are comparative discharge curves of cells produced according to the present invention.

PRESENTLY PREFERRED EMBODIMENTS

Figure 1:
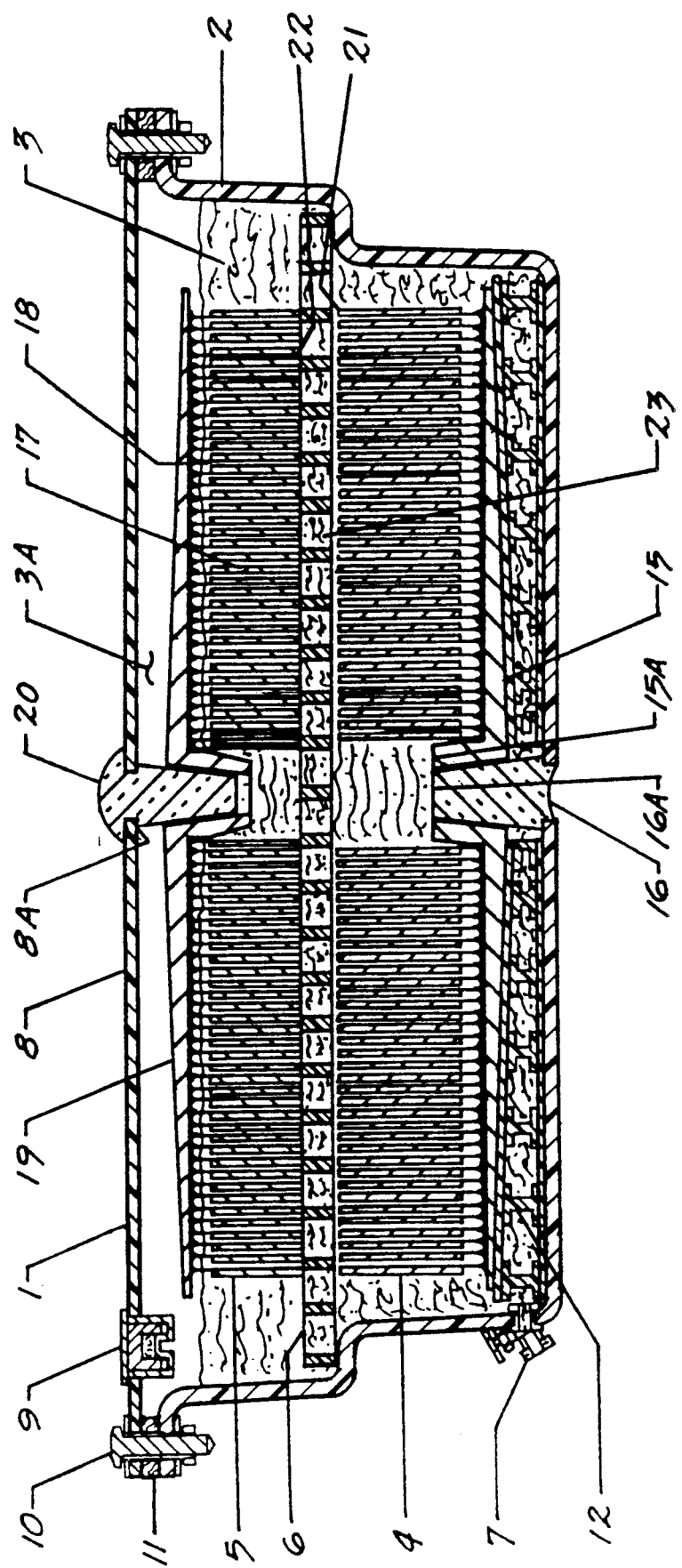
FIG. 1 is a sectional elevation of a cell of the present invention.

Referring to FIG. 1 a lead-acid electrochemical cell 1 is shown which comprises an acid-resistant outer container 2 containing sulfuric acid electrolyte 3, a singular unitized positive electrode 4, a singular unitized negative electrode 5 and an electrically insulating support structure 6. Support structure 6 supports negative electrode 5 and maintains a physical and electrical separation between negative electrode 5 and positive electrode 4. Acid-resistant outer container 2 may also include a controllable means of evacuating said sulfuric acid electrolyte such as spigot 7. Also shown is a removable top cover 8 preferably containing pressure relief vent 9 and external electrode seal 8A. Top cover 8 can be fastened, for example, by means of bolts 10 and gasket 11, which also seal the cell and prevent liquid and gas from escaping to the atmosphere.

Figure 1A:
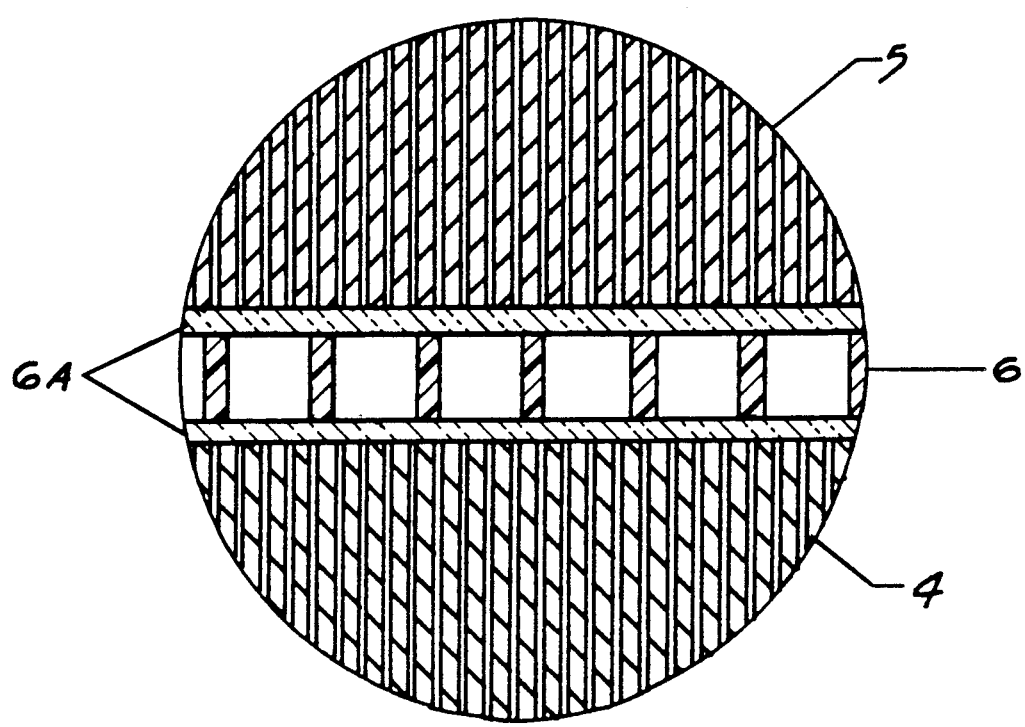
FIG. 1A is an explored sectional elevation showing an embodiment of the invention wherein a porous separator material is used in connection with support structure to separate the positive and negative unitized electrodes.

In FIG. 1A there is disclosed a separator structure in which a porous separator material 6A is used in connection with support structure 6. Also, it is possible to omit a structure between the positive and negative unitized electrodes by supporting the electrodes independently, such as from the top and bottom of the container.

Figure 2:
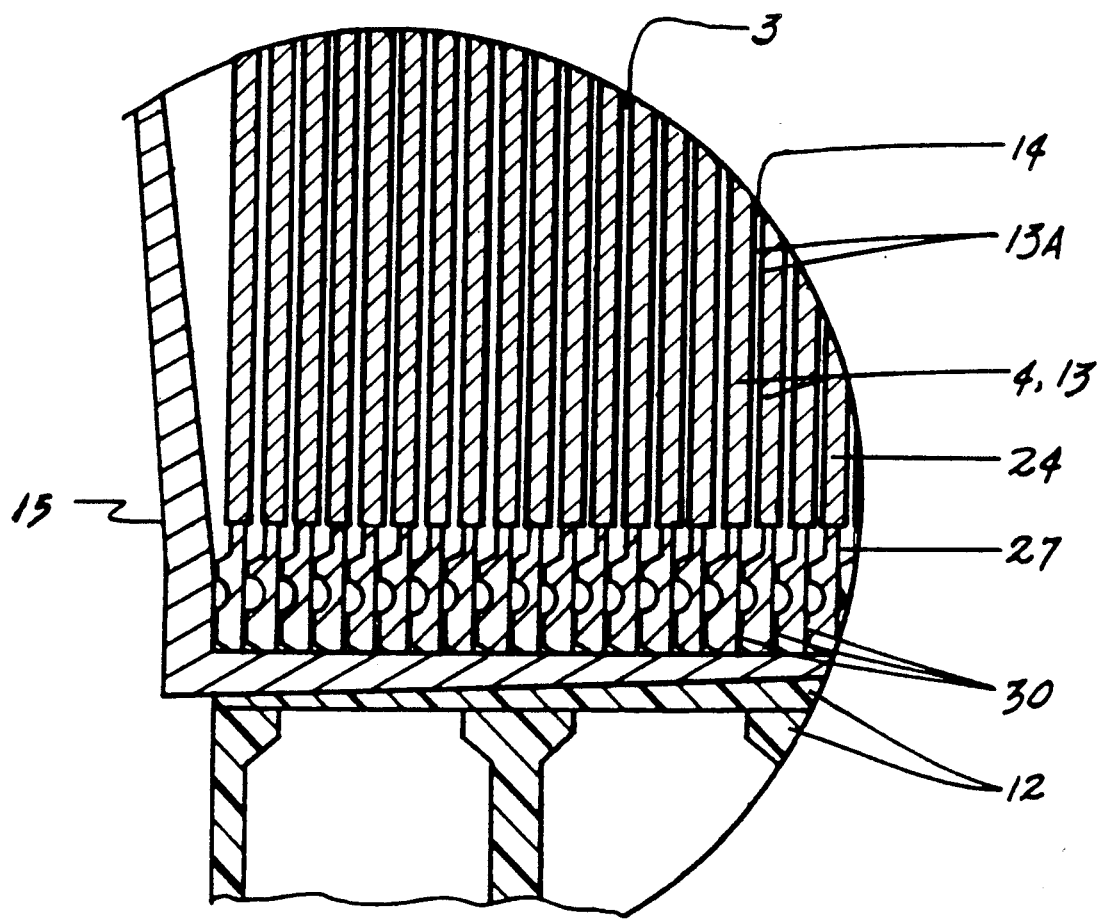
FIG. 2 is an enlarged view in partial section of a unitized electrode.

With reference to FIG. 2, the unitized positive electrode 4, preferably comprises a continuous length of electrochemically formed battery plate stock 13. Battery plate stock 13 is made from lead or lead alloy and includes a paste over the major surfaces. This paste is, lead oxide, water, sulfuric acid and binder, for example. Plate stock 13 is coiled to form one or more laps. When coiled to provide a coil containing more than one lap, a space is maintained between the pasted surfaces of adjacent laps 13A to form channel 14 through which the sulfuric acid electrolyte 3 can flow in intimate contact with the plurality of pasted surfaces. Channel 14 also provides a means through which any gas generated during charging can escape from the electrode. A lead current collector 15, see FIG. 1, is in intimate physical and electrical contact with each lap of the coiled plate stock and with external electrical contact 16 that is integrally attached to the acid resistant outer container 2. Positive lead current collector 15 may be solid or, preferably, may contain passages through which the sulfuric acid electrolyte 3 may circulate.

Unitized negative electrode 5, is similar in construction to positive electrode 4 and comprises a continuous length of electrochemically formed battery plate stock 17. Battery plate stock 17 includes a paste over its major surface, comprising, for example, lead oxide, water, sulfuric acid, binder and expander. Plate stock 17 is coiled to form one or more laps. When the coil contains more than one lap, a space is maintained between adjacent laps to form channel 18 through which sulfuric acid electrolyte 3 flows and through which any gas generated during charging can escape from the electrode. Current collector 19 is in intimate physical and electrical contact with each lap of the coil and with an external electrical contact 20 that integrally attached to top cover 8. The negative lead current collector 19 may be solid or, preferably, may contain passages through which the sulfuric acid electrolyte 3 may circulate.

The positive electrode 4 and negative electrode 5 are juxtaposed vertically so that the positive electrode is positioned beneath the negative electrode. The distance between the positive and negative electrode is from 0.005 to 1.0 inch, preferably between ⅛ to ¾ of an inch. In a preferred embodiment the distance is about ½ of an inch.

The pasted major surfaces of the positive electrode and the negative electrode have a substantially vertical orientation. Edge 21 of each lap of the positive electrode is situated generally opposite to an associated edge 22 of the negative electrode. The axes of the positive electrode and the negative electrode are essentially vertical and generally coincide, said positive electrode and said negative electrode are separated by a space 23 containing the sulfuric acid electrolyte 3.

Figure 3:
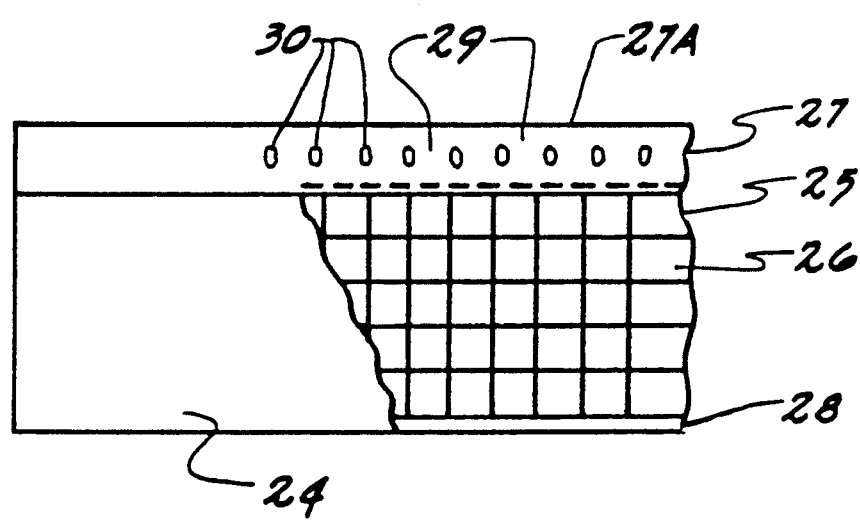
FIG. 3 is a partial plane view of pasted plate stock used in constructing a unitized electrode according to the current invention.

Referring to FIG. 3, the starting battery plate stock employed in the construction of the positive electrode 4 and negative electrode 5 normally consists of a layer of battery paste 24 applied to battery grid strip 25. Preferably, paste 24 is of a composition selected to achieve the desired polarity of said plate stocked after electrochemical formation. Continuous battery grid strip 25 includes a reticulated grid portion 26, a lug portion 27 and a bottom border portion 28. Lug portion 27 consists of an edge 27A and a surface 29 which preferably includes protrusions 30 which extend beyond the outer surface of paste layer 24. The continuous length of battery grid stock may be produced by continuous casting, metal expansion, or any technique which yields a structure similar to that described herein. Pasting may be accomplished by means of an orifice paster, a belt paster, or any other technique suitable for pasting and coiling continuous lengths of material. The pasted plate stock may be flush pasted (paste layer equal to the thickness of the grid stock), overpasted on one side (flush pasted on one side with the paste extending beyond the surface of the grid on the opposite side), or overpasted on both sides, and the paste layer may be flat or profiled to increase surface area.

It is preferred that the space between the pasted side surfaces of the laps in the coiled positive electrode 4 and the coiled negative electrode 5 be achieved by controlling the height of the protrusions 30. The height of said protrusions is greater than the thickness of the paste layer 24 by an amount that will result in the space 14 or 18, respectively, desired between laps. Other methods of achieving the desired space between adjacent pasted surfaces in the electrode include the use of an external spacer placed adjacent to the lug portion 27, the use of spacer bars between laps, wrapping the coil loosely, or any other means which yields such a space between said adjacent surfaces.

The pasted coils so produced may be cured and formed in coil form using techniques known to those skilled in the art. The coils of cured positive plate stock and cured negative plate stock may be electrochemically formed prior to insertion into the cell or cured coils may be placed in the cell container and electrochemically formed in situ.

It is preferred that the positive plate stock and the negative plate stock be pasted to the same thickness and that the coils of plate stock be of the same diameter and contain the same number of laps. Further, it is preferred that the relative weights of positive active material and negative active material be controlled by adjusting the height of the electrodes. However, it will be obvious to those skilled in the art that the relative weights of the positive and negative active materials in a cell may also be controlled by varying the pasted thickness, spacing between surfaces, and overall length of the plate stock used in constructing the electrode.

In the preferred cells the height of the pasted portion of the positive and negative electrodes may range from ¼" to 12". depending upon the capacity desired and physical size of the cell. The thickness of the bottom portion 28 which is the portion of the electrode facing, and closest to, the opposing electrode may range from 0.040" to 0.250", with a range of 0.060" to 0.125" preferred. The width of the lug portion 27 may range from 3/16" to 1" with ¼" being preferred. Spacings 14 and 18, respectively, between adjacent pasted surfaces within the electrode may range from 0.001" to 0.060" with a spacing of 0.010" to 0.050" preferred and a spacing of 0.010" to 0.020" most preferred. The spacing between electrodes 23 may range from 0.005" to 1" with a spacing of ⅛" to ¾" preferred and a spacing of ½" most preferred. The actual dimensions employed in a given cell will depend upon the capacity of the cell, the type of service for which the cell will be used, and the permissible overall size of the cell.

The positive lead current collector 15 may be integrally attached to the positive battery plate stock 13 to form the unitized positive electrode 4, and the negative current collector 19 may be integrally attached to the negative plate stock 17 to form the unitized negative electrode 5, by bringing molten lead or lead alloy into intimate contact with all, or a portion of, the lug portion 27 of said battery plate stock and allowing said molten lead or lead alloy to solidify. It is preferred that the conditions under which the molten lead or lead alloy is applied be such that a portion of said lug portion is melted or molten lead or lead alloy "wets" and remains in intimate electrical contact with the lug portion. Fluxes may be used to obtain the desired degree of "wetting." Other methods of integrally attaching said lead current collector to said battery plate stock include soldering or welding solid forms of corrosion resistant, electrically conductive material, such as lead sheet, plate, rod, or wire, to said battery plate stock.

A preferred method of attaching the lead current collector to the positive or negative battery plate stock is to dip said plate stock into a bath of molten lead or lead alloy contained in a mold cavity shaped such that, upon solidification, the lead attains the desired shape which may contain the integral external electrical connection which represents a preferred embodiment of the invention. The lead current collector may be solid and continuous throughout its entire volume or may contain passages through which gases generated during formation or charging may pass. Said passages may be formed during the solidification of the lead current collector or may be added by machining or other means after said current collector has solidified.

Preferably, the cross-sectional area of the positive lead current collector 15 and the negative lead current collector 19 are uniform throughout the current collector. In a particularly preferred embodiment the cross-sectional area gradually increases from the edge of the current collector to the portion in contact with the external electrical contact in order to compensate for the increase in current density which occurs from said edge to said portion in contact with the external electrical contact.

It is preferred that the lead current collector be in intimate contact with the edge portion 27A of the lug portion 27 of the battery plate stock along 50% to 100% of the length of said lug portion. This provides a decrease in electrical resistance and assures a more uniform utilization of the electrochemically formed battery paste. Intimate contact along more than 15% of the length of said lug portion provides improved electrical conductivity and utilization relative to the electrical conductivity and utilization found in conventional battery plate/strap collector assemblies. Contact along less than 100% of the length of said lug portion may be accomplished by leaving gaps such as radial or circumferential gaps, holes, or slots in the lead current collector, or by casting discrete lugs which extend from said lug portion periodically along its length and which are the only part of said lug portion which contact said lead current collector.

It is further preferred that the unitized electrodes 4 and 5 be produced by attaching lead current collector 15 and 19, respectively, to the battery plate stock making up respective electrodes prior to electrochemical formation. It is also possible to practice the invention by electrochemically forming the battery plate stock prior to attachment of the current collector to said plate stock, but this is not a preferred method.

In addition to producing the unitized electrodes from coiled battery plate stock to increase the pasted surface area in contact with the sulfuric acid electrolyte, it is also possible to attach two or more individual plates or two or more cut lengths of pasted plate stock to a lead or lead alloy current collector. In such case the space is maintained between the pasted surfaces of the individual plates or cut lengths of pasted plate stock. Further, the individual plates or cut lengths are in intimate electrical contact with said current collector along more than 15% of the upper border of the individual plates or 15% of the lug portion of the cut lengths of pasted plate stock. Electrical contact between the current collector and the upper border along more than 50% of said upper border is preferred. The cross-section of a unitized electrode consisting of two or more individual plates or cut lengths of pasted plate stock may be rectangular, triangular, polygonal, or of any other usable shape, so long as the opposing electrode in the cell is of a substantially similar shape and contains approximately the same number of individual plates or cut lengths of pasted plate stock.

Regardless of whether coil stock, individual plates, or cut lengths of battery plate stock are used to construct a unitized electrode, the space maintained between adjacent pasted surfaces contained within the unitized electrode should be less than the total thickness of the electrochemically formed battery paste layer of the coil stock, individual plates, or cut lengths of battery plate stock used in the construction of the opposing electrode.

By charging a cell constructed in accordance with this invention in such a manner that gassing is minimized and by not circulating the sulfuric acid electrolyte by external means, such as bubbling compressed air through the electrolyte, striation of the sulfuric acid electrolyte is encouraged and the specific gravity of the acid at the bottom of the cell is allowed to become higher than the specific gravity of the acid at the top of the cell. Since the positive electrode is preferably positioned directly beneath the negative electrode, as shown in FIG. 1, the entire positive electrode is located in acid of higher gravity and the entire negative electrode is located in acid of lower gravity. The utilization of acid striation, thus, enhances cell performance by allowing the positive electrode to function in higher gravity acid, which enhances positive electrode performance by reducing the possibility of failure due to positive grid corrosion, and by allowing the negative electrode to operate in lower gravity acid, which enhances the performance of said negative electrode and reduces the possibility of sulfation. Therefore, positioning the positive electrode below the negative electrode and allowing striation of the acid to occur results in improved cell efficiency and increased cell life.

A further advantage of locating the unitized negative electrode directly above the unitized positive electrode is that such construction allows the cell to be made recombinant without the need to add costly porous fiber separators and to immobilize the electrolyte therein. Recombination of the oxygen generated during charging of a cell in which two electrodes of opposite polarity are juxtaposed edge-to-edge and in which none of the sulfuric acid electrolyte is absorbed in a porous insulating separator, and in which 100% of the active material of the negative electrode 5 is submerged beneath the surface of said electrolyte, can be achieved by maintaining all, or a portion, of negative lead current collector 19 in space 3A above the level of said electrolyte where it is available to react with said oxygen. The surface area of the negative electrode available to support the recombination reaction can be further increased by maintaining a small portion, i.e., less than 10%, and preferably less than 5%, of the height of negative active material layer in the negative electrode in space 3A above the level of the sulfuric acid electrolyte 3. In constructions of this type, the unsubmerged portion of the negative active material is that situated closest to the top edge of the negative battery plate stock which is in contact with said negative current collector, and the plane of the negative active material situated between said top edge of said negative battery plate stock and the opposing bottom edge of said negative battery plate stock is submerged beneath the surface of said sulfuric acid electrolyte. The amount of active lead within said unitized negative electrode that is available to react can be easily adjusted by controlling the level of electrolyte within the cell.

Recombination of the oxygen generated during the charging can also be achieved in a cell in which two electrodes of opposite polarity are juxtaposed edge-to-edge and in which the sulfuric acid electrolyte is fully absorbed in a porous insulating separator by maintaining a layer of said separator in the space between the adjacent surfaces of the active material contained in each of said electrodes and in the gap maintained between said electrodes such that a contiguous volume of said electrolyte is maintained in said cell.

Also, recombination can be achieved as heretofore described in a cell in which a portion of the sulfuric acid electrolyte is absorbed in a porous insulating separator and a portion of said electrolyte is free and unabsorbed.

Although it is preferred that unitized positive electrode 4 be juxtaposed beneath unitized negative electrode 5, advantages also can be achieved by positioning the unitized negative electrode beneath the unitized positive electrode.

The use of the preferred unitized electrodes greatly simplifies and reduces the cost of cell assembly, battery assembly, and cell and battery disassembly at the end of life by eliminating costly separators and the labor involved in installation of same, eliminating the need to interpose negative plates, separators, and positive plates in alternating fashion, and allowing the entire negative electrode and the entire positive electrode to be inserted and removed from the cell container as discrete singular units.

With reference to FIG. 1, a cell may be constructed by lowering positive plate support spool 12, upon which is situated the unitized positive electrode 4, into acid resistant cell container 2 in such a manner that the positive external electrical contact 16 which is permanently attached to the cell container slides into the central hollow portion of the integral positive lead current collector 15 so that the end of positive external electrical contact 16A and the end of positive lead current collector 15A may or may not be flush with one another. The ends of the positive external electrical contact are welded or soldered to the positive lead current collector to achieve intimate electrical contact. The assembly consisting of the electrically insulating support structure 6 and the unitized negative electrode 5 is lowered into said acid resistant container and cell cover 8 is lowered onto the container so that the cover rests upon acid resistant gasket 11 and negative external electrical contact 20 is forced into intimate electrical contact with negative lead current collector 19. Negative external electrical contact 20 is attached to top cover 8 through seal 8A such that a gas-tight and liquid-tight joint is formed between the seal and the negative external electrical contact. The cover is attached to cell container 2 by means of bolts 10 or some other effective means of achieving a gas-tight and liquid-tight seal between the cover and the cell container. The proper amount of sulfuric acid electrolyte is added through the hole in cell cover 8 which is thereafter fitted with vent 9, which forms a gas-tight and liquid-tight seal by means of an acid-resistant gasket, potting, or any other suitable means of obtaining the desired seal.

Methods of achieving a liquid-tight and gas-tight seal between negative external electrical contact 20 and seal 8A in cover 8 include soldering or welding the negative external electrical contact to the cover or to an insert in said cover, potting the interface between said components with a polymeric or other type of sealing compound, mechanical deformation of said negative external electrical contact or said inset to form a mechanical seal, or preferably the use of an "O" ring or gasket.

Disassembly of cells constructed in accordance with the present invention may be easily achieved by reversing the aforesaid procedure and removing sulfuric acid electrolyte 3 from cell container 2 by means of valve 7.

The heretofore described cell construction, assembly and disassembly techniques greatly increase the scrap value of batteries and cells at the end of useful life. Unlike conventional lead-acid cells and batteries which normally require that all or most components, including the case, cover, separators, internal and external current collectors, and spent positive and negative plates be handled and reprocessed in order to recover the lead, lead oxide and such other material in the cell. The scrap from cells constructed in accordance with the present invention consists solely of the lead, lead oxides in the unitized electrodes. Accordingly, all other components in the cell such as acid-resistant container 2, the electrically insulating support structure 6, the positive plate support spool 12, the cell cover 8, and possibly the bolts 10 and gasket 11 are easily separated from the lead values in the cell and are, for the most part, reusable.

It is also possible to replace only one failed electrode and to rebuild the cell using the electrode of opposite polarity.

Unlike conventional lead-acid batteries which have the positive external electrical contact and the negative electrical contact on the same exterior surface of the cell, normally the top surface or one of the side surfaces, batteries produced from cells constructed in accordance with the present invention contain the positive external electrical contact and the negative external electrical contact on opposite exterior surfaces of the cell. As an example, the preferred cell construction heretofore described in which the unitized positive electrode is positioned directly beneath the unitized negative electrode would have the positive external electrical contact on the bottom exterior surface of the cell and the negative external electrical contact on the top exterior surface of the cell. A cell in which the unitized positive electrode is positioned directly above the unitized negative electrode has the external electrical contacts reversed.

Figure 4:
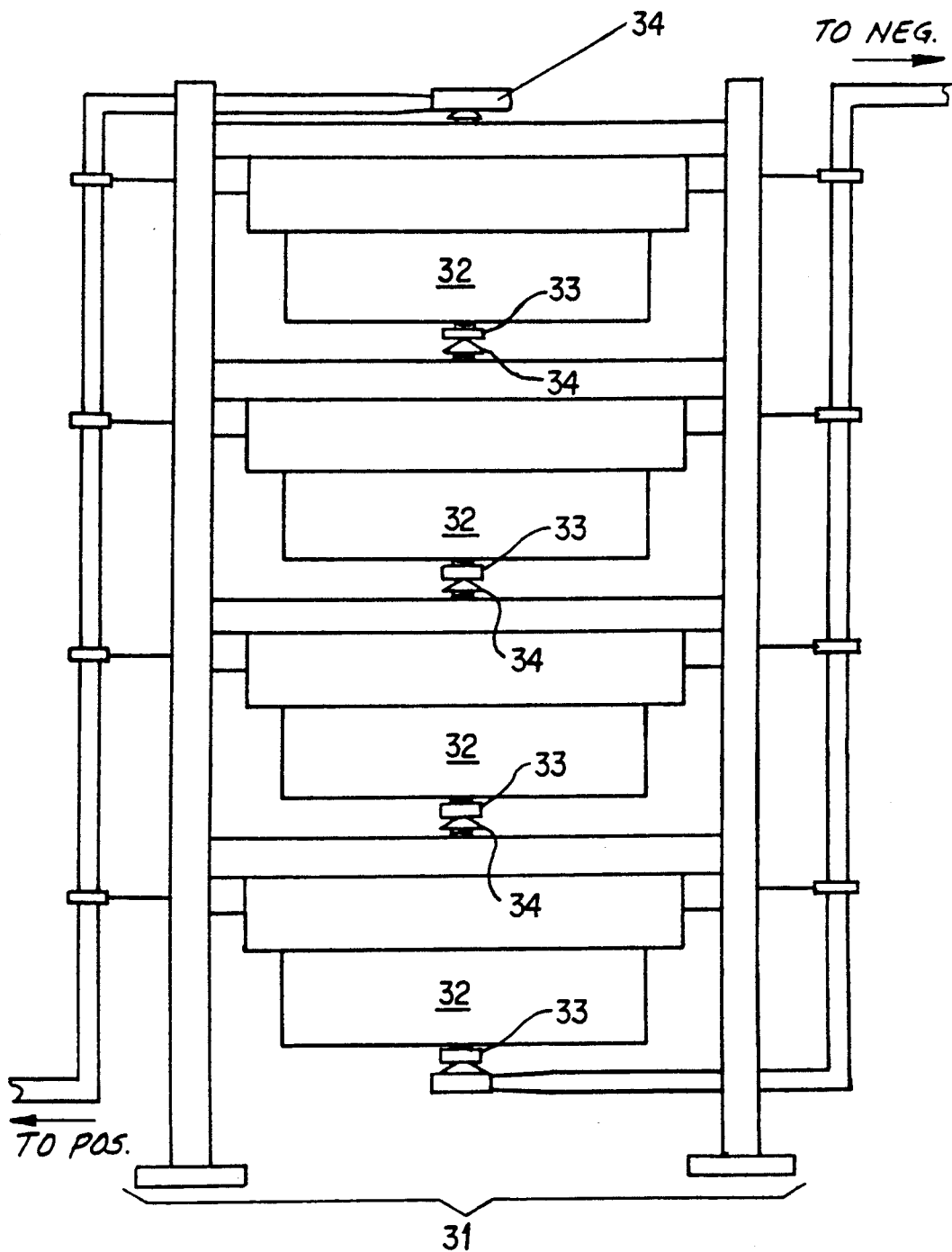
FIG. 4 is a side elevation of a number of cells connected in series.

As shown in FIG. 4, the placement of one external electrical contact on one exterior surface of the cell and the external electrical contact of opposite polarity on the opposite exterior surface of the cell allows a battery 31 to be produced by stacking cells 32 vertically such that the positive external electrical contact of one cell 33 is in intimate contact with the negative external electrical contact 34 of the adjacent cell. In this manner, batteries of any desired voltage can be produced by stacking the proper number of cells one upon the other as, for example, in a 3-cell/6-volt battery, a 6-cell/12-volt battery, or a 1,000-cell/2,000-volt battery.

Also, the cells may be juxtaposed side-by-side to achieve the same effect by positioning the unitized positive electrode and the unitized negative electrode side-by-side in such a manner as to achieve an "edge-to-edge" configuration, thereby locating the positive external electrical contact and negative external electrical contact on opposing external side surfaces of the cell. It should also be noted that a similar construction can be achieved by placing a plurality of such cells in a single external container consisting of individual compartments separated by integral partitions through which the external electrical contacts of electrodes of opposite polarity pass and are joined together.

In addition to stacking cell in series as heretofore described, cells constructed in accordance with the present invention may also be electrically connected in parallel to increase battery capacity at a given voltage and that banks of cells so connected may be connected in series to obtain a battery of the desired voltage.

The following examples further illustrate the features of this invention.

EXAMPLE 1

This example illustrates that satisfactory cell performance can be achieved when a cell containing one unitized positive electrode and one unitized negative electrode juxtaposed vertically such that one edge surface of said positive electrode is adjacent to, and essentially directly opposite, one edge surface of said negative electrode, is charged and discharged in a normal fashion.

Figure 5A:
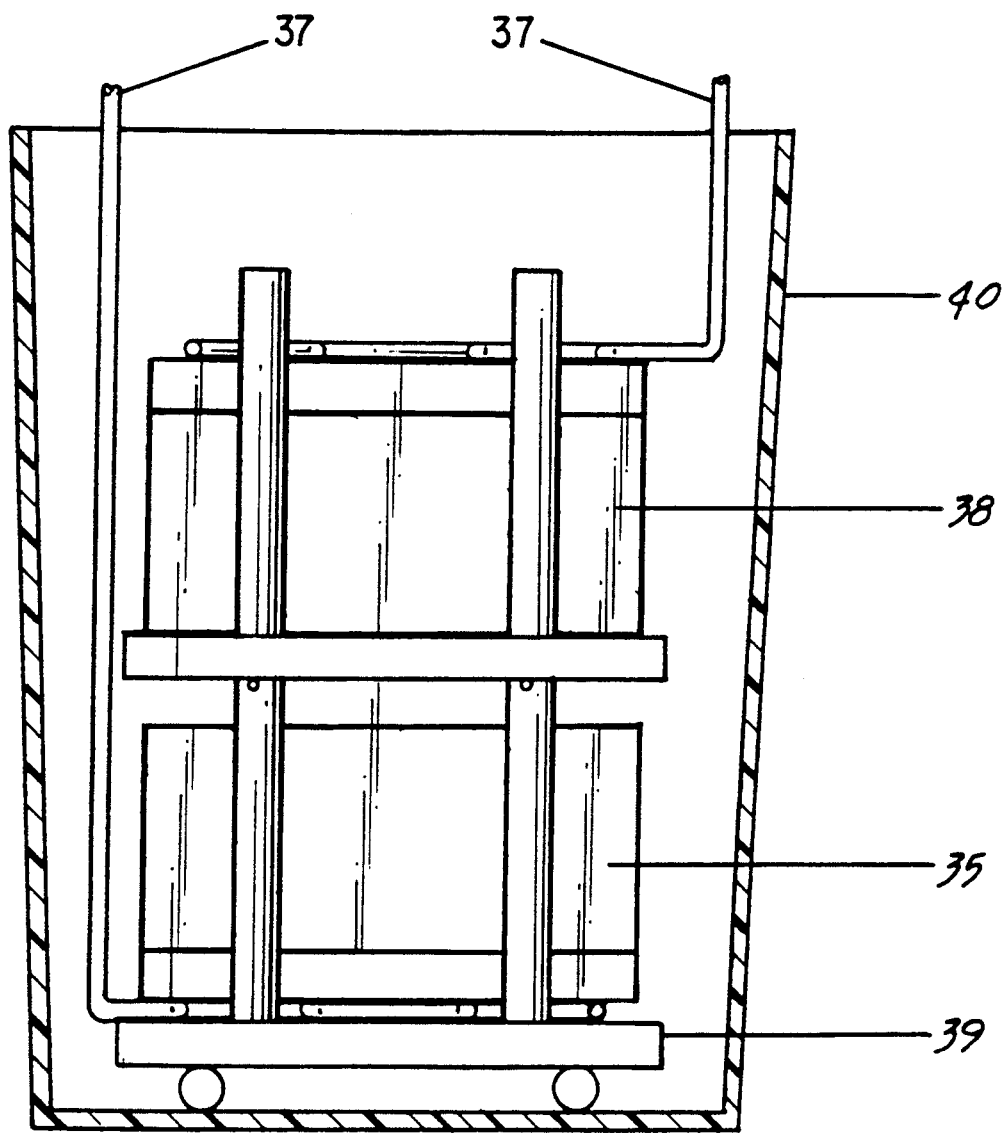
FIG. 5A is a side elevation of the construction shown in FIG. 5.
Figure 5:
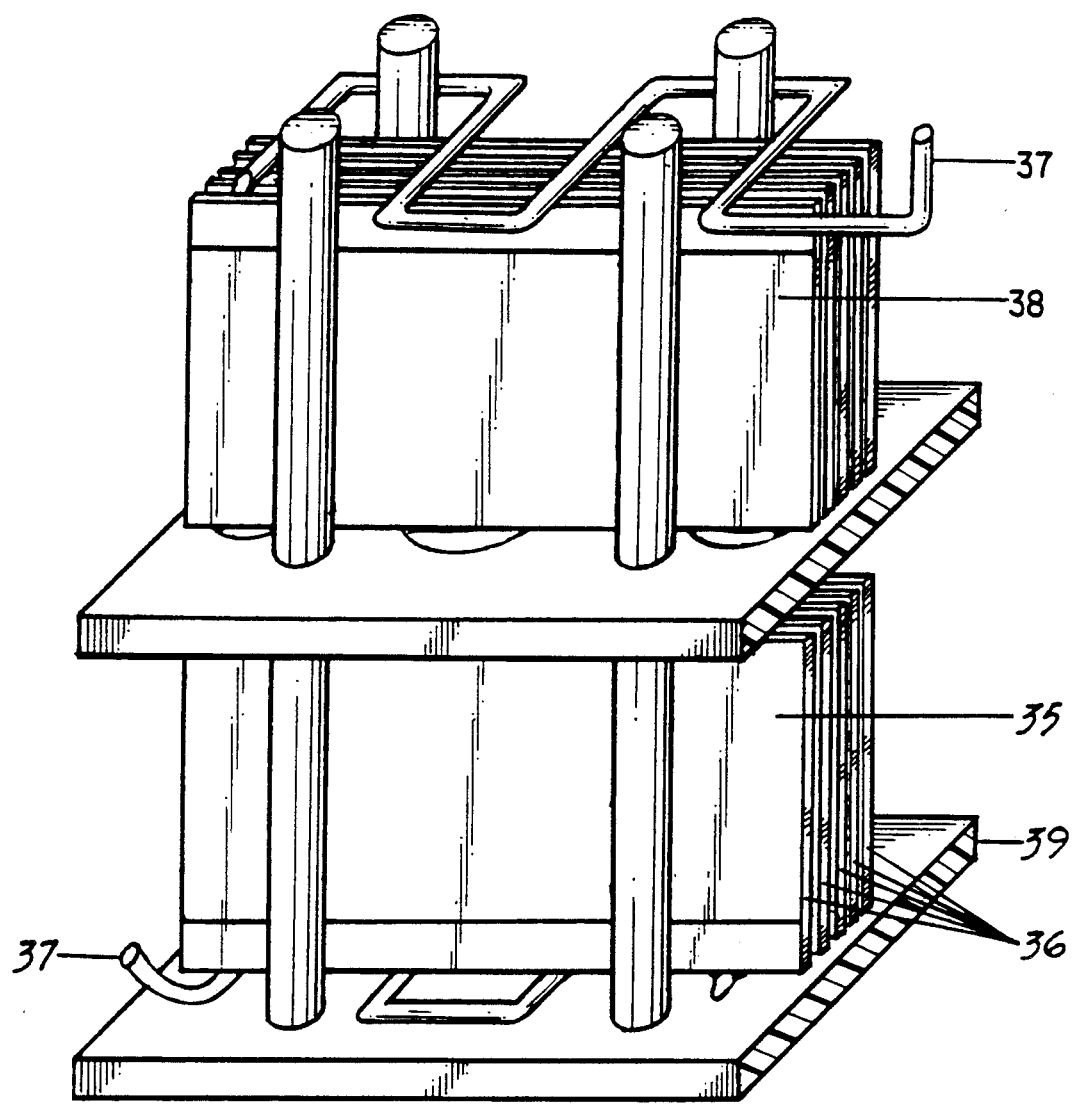
FIG. 5 is a perspective view of a cell containing one embodiment of the electrodes and conductors according to the present invention.

In this example, a cell similar to that shown in FIG. 5 was subjected to a series of charge/discharge cycles to determine capacity and efficiency (expressed in watt-hours per pound of positive active material).

Figure 6A:
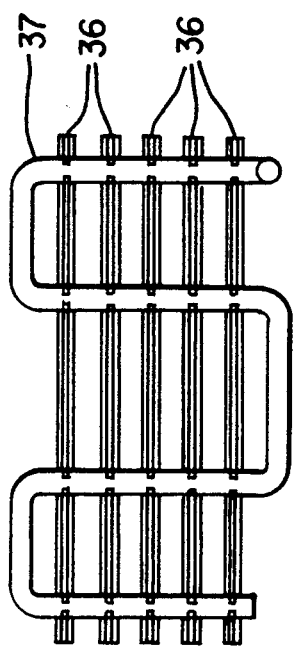
FIGS. 6A–C are elevation side and front views detailing the electrode construction and conductor connection means shown in FIGS. 5 and 5A.
Figure 6B:
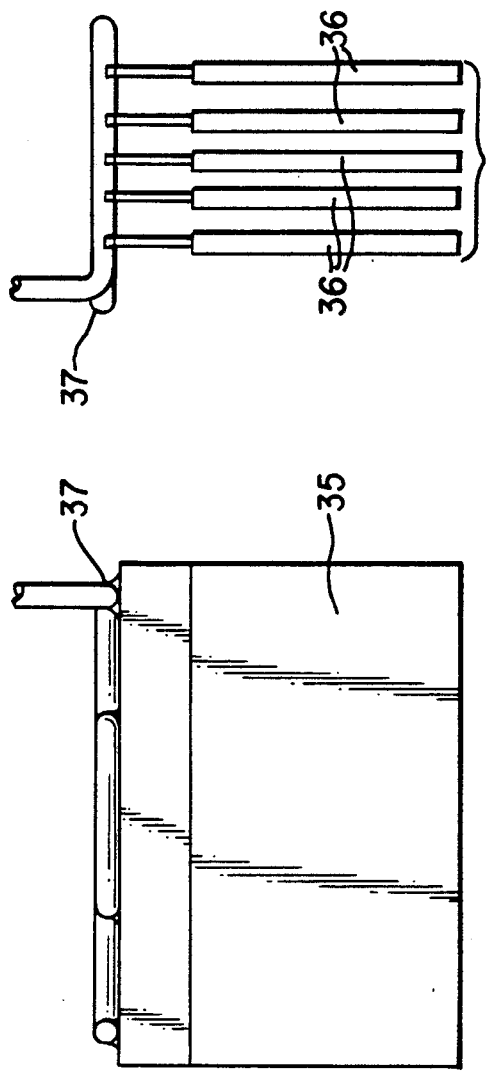
Figure 6C:
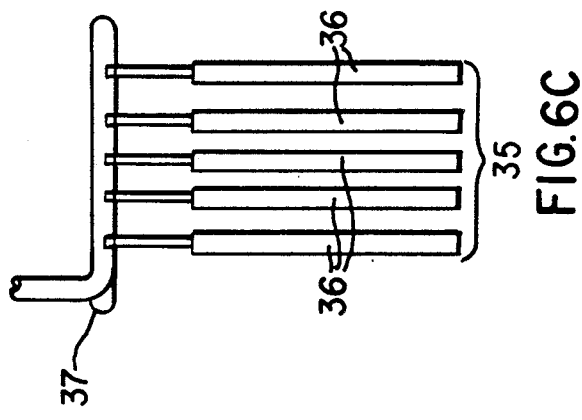

Referring to FIGS. 5 and 5A, said cell contained a unitized positive electrode 35 which consisted of five cut lengths of cured positive battery plate stock 36, each measuring 5.75"L×4.65"H, joined together physically and electrically in parallel, as illustrated in FIG. 6, by means of a 0.125"D lead wire 37 external current connector such that the external current connector was in intimate electrical contact with each of the cut lengths of positive battery plate stock at a minimum of four locations along said 5.75" length. Each of said cut lengths of positive battery plate stock consisted of a lead-1% antimony alloy grid structure containing a 5.75"L×3.9"H reticulated grid portion and a 5.75"L×0.75"H solid lug portion and a 5.75"L×3.9"H profiled paste layer with an overall profile thickness of 0.075". Paste layer contained approximately 67 grams of cured positive paste. The space between the cut lengths of positive battery plate stock was 0.060".

The unitized negative electrode 38, which was constructed in a manner essentially identical to that described above, consisted of five cut lengths of cured negative battery plate stock each measuring 5.75"L×4.65"H, joined together physically and electrically in parallel, as illustrated in FIG. 6, by means of a 0.125"D lead wire 37 external current connector such that the external current connector was in intimate electrical contact with each of the cut lengths of negative battery plate stock at a minimum of four locations along said 5.75" length. Each of said cut lengths of negative battery plate stock consisted of a lead-1% antimony alloy grid structure containing a 5.75"L×3.9"H reticulated grid portion and a 5.75"L×0.75"H solid lug portion and a 5.75"L×3.9"H profiled paste layer with an overall profiled thickness of 0.075". The paste layer contained approximately 67 grams of cured negative paste. The space between the cut lengths of negative battery plate stock was approximately 0.060".

Referring to FIG. 5A, the unitized positive electrode 35 and unitized negative electrode 38 were electrochemically formed by (a) positioning the positive electrode directly beneath said negative electrode in a rack 39, which aligned the electrodes such that one edge of the individual cut lengths of cured negative battery plate stock of the negative electrode were positioned essentially directly above one edge of the individual cut lengths of cured positive battery plate stock of the positive electrode and which contained provision to permit free acid flow between the electrodes;

(b) placing the rack in a 6"L×4"W×10"H acid resistant container 40 consisting of polypropylene;

(c) placing the acid resistant container in a water bath controlled to a temperature of approximately 150° F. (65° C.);

(d) filling the acid resistant container with approximately 14.9 liters of sulfuric acid of 1.05 specific gravity;

(e) attaching the positive external current connector and the negative external current connector to the positive and negative terminals of the formation power supply, respectively; and (f) electrochemically forming the electrodes at 15 amperes for 5½ hours followed by 10 amperes for 7 hours to yield a total level of formation of 206 ampere-hours per pound of positive active material.

Figure 7:
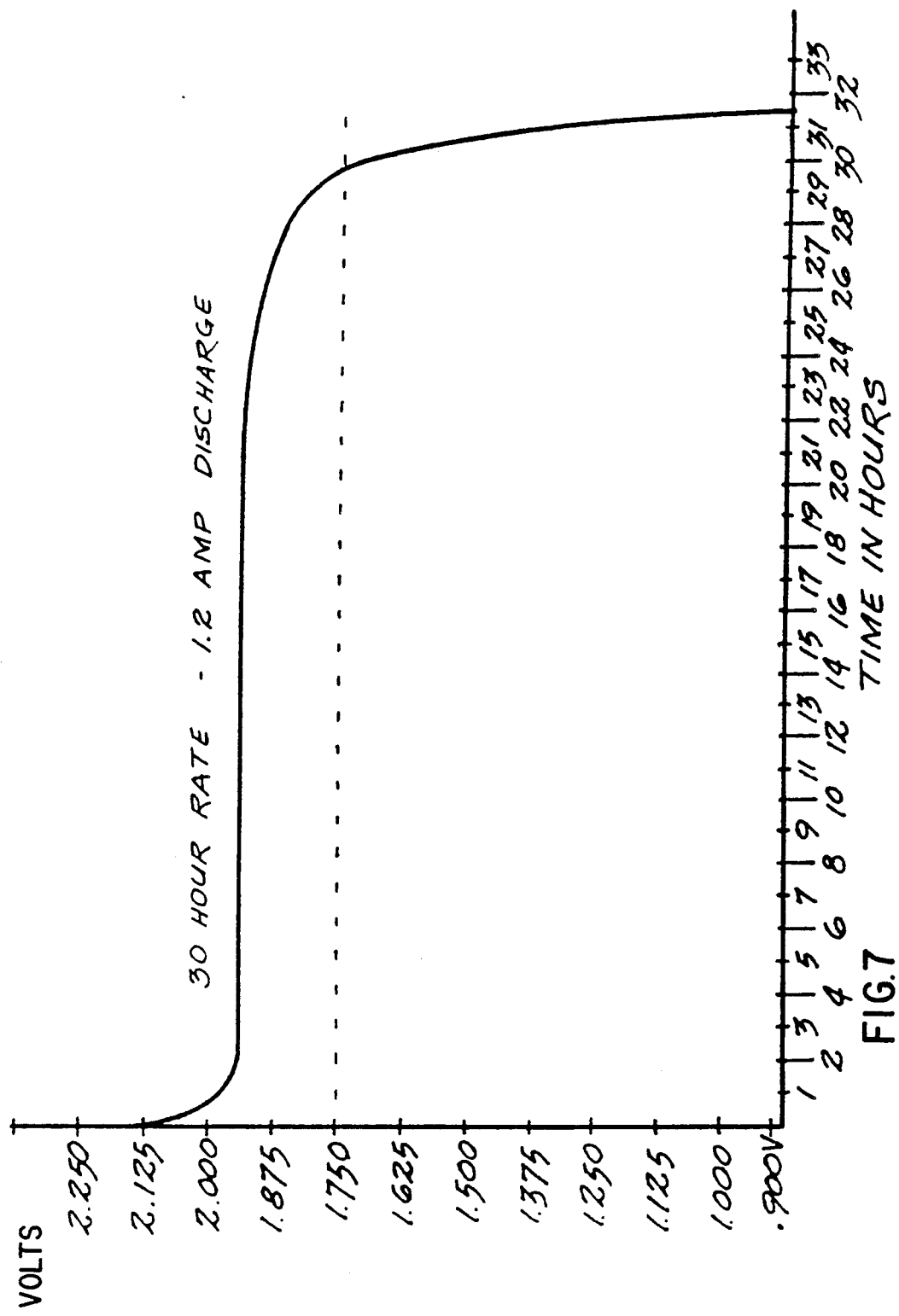
FIG. 7 is a discharge curve of a cell according to the present invention.

The cell illustrated in FIG. 5A was constructed by removing the acid resistant container from the water bath, removing the formation acid, and replacing the formation acid with approximately 14.9 liters of 1.265 specific gravity sulfuric acid without washing and drying the positive and negative electrodes. The space between the unitized positive electrode and the unitized negative electrode was approximately one inch. The cell so produced had a ratio of formed negative active material weight to formed positive active material weight of approximately 0.95:1 and a ratio of total acid weight to total formed active material weight of approximately 30:1. The cell was then discharged at room temperature at a current of 1.2 amperes to a cut-off voltage of 1.75V. As illustrated in FIG. 7, which shows cell voltage as a function of total discharge time, the cell discharged for approximately 30 hours before reaching cut-off voltage and exhibited a total capacity of approximately 36 ampere-hours, a capacity of approximately 51.4 ampere-hours per pound of positive active material, and a minimum of 97 watt-hours per pound (44 watt-hours per kilogram) of positive active material. As will be obvious to those skilled in the art, the shape of the discharge curve for the cell described herein is typical of that expected for a conventional lead-acid battery in which the plates are juxtaposed side-by-side with the pasted side surfaces of individual positive and negative plates adjacent, and parallel to, one another.

EXAMPLE 2

This example illustrates the effect of positive and negative electrode height on the discharge performance of cells containing one unitized positive electrode and one unitized negative electrode juxtaposed vertically such that one edge of the positive electrode is adjacent to, and essentially directly opposite, one edge of the negative electrode, when the cells are charged and discharged in a normal fashion, and that satisfactory performance can be achieved with the use of electrodes of varying height.

In this example, three such cells, similar to that shown in FIG. 5, were subjected to a series of charge/-discharge cycles to determine capacity and efficiency (expressed in watt-hours per pound of positive active material).

Figure 8C:
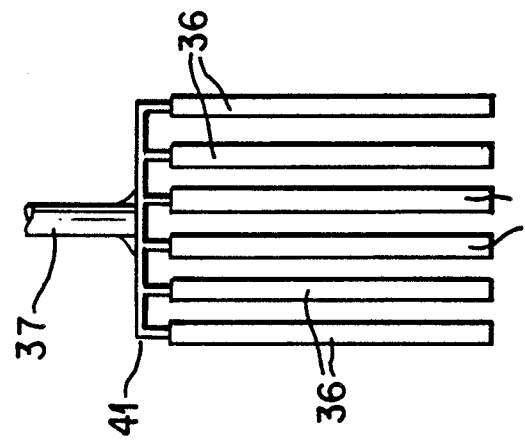
FIGS. 8A–C are plane, side and front elevations of a preferred electrode embodiment.
Figure 8A:
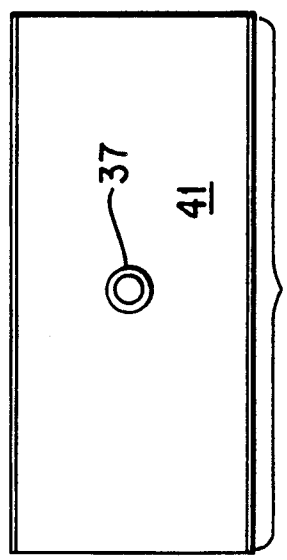
Figure 8B:
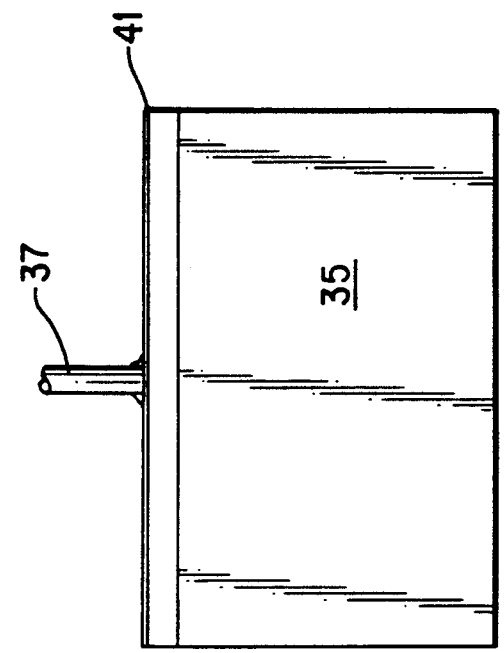

Referring to FIG. 5, each cell contained one unitized positive electrode 35 which consisted of a number of 5.75" lengths of cured positive battery plate stock 36 spaced approximately 0.060" apart and joined together physically and electrically in parallel, as illustrated in FIG. 8, by means of a solid lead alloy current collector 41 such that said current collector was in intimate electrical contact with each of the cut lengths of positive battery plate stock along approximately 100% of said 5.75" length and one unitized negative electrode 38 which consisted of a number of 5.75" lengths of cured negative battery plate stock spaced approximately 0.060" apart and joined physically and electrically in parallel in a manner essentially identical to that utilized in the construction of said unitized positive electrode. The distance between the unitized electrodes was approximately 0.250". Each of the cut lengths of positive battery plate stock and negative battery plate stock consisted of a lead-1% antimony alloy grid structure containing a 5.75"L×0.125"H solid lug portion and a 5.75"L reticulated grip portion containing an integral profiled paste layer, the height of which was varied between cells. The solid lead alloy current collector was made by holding all of said cut lengths of cured battery plate stock contained in a single unitized electrode tightly together, applying flux to the solid lug portion of each of the cut lengths, and puddling molten 60% lead-40% tin alloy on top of the lug strips until approximately 100% of the edge area of each of the lug strips were wetted by the alloy. A 0.125"D lead wire external current connector was applied to each unitized electrode by soldering the wire to the solid lead alloy current collector.

The unitized positive and negative electrodes in Cell #1 each contained six cut lengths of cured battery plate stock, each of which contained a 5.75"L×3.75"H×0.075"T profiled paste layer weighing approximately 78 grams. The total cured weight of positive active material and the total cured weight of negative active material in Cell #1 were each approximately 467 grams.

The unitized positive and negative electrodes in Cell #2 each contained eight cut lengths of cured battery plat stock, each of which contained a 5.75"L×2.75"×0.075"T profiled paste layer weighing approximately 58 grams. The total weight of cured positive active material and the total weight of cured negative active material in Cell #2 were each approximately 460 grams.

The unitized positive and negative electrodes of Cell #3 each contained 13 cut lengths of cured battery plat stock, each of which contained a 5.75"L×1.75"H×0.075"T profiled paste layer weighing approximately 37 grams. The total weight of cured positive active material and the total weight of cured negative active material in Cell #3 were each approximately 476 grams.

Referring to FIG. 5A, the unitized positive electrode 35 and unitized negative electrode 38 of each of the aforesaid cells were electrochemically formed by (a) positioning the positive electrode of each cell directly beneath the negative electrode of the same cell in a rack 39, which aligned the electrodes such that one edge of the individual cut lengths of cured negative battery plate stock of the negative electrode were positioned essentially directly above one edge of the individual cut lengths of cured positive battery plate stock of the positive electrode and separated by 0.250" spacer which contained provision to permit free acid flow between said electrodes;

(b) the rack was placed in a 6"L×3.5"W×10"H acid resistant container 40;

(c) the acid resistant container was placed in a water bath controlled to a temperature of approximately 150° F. (65° C.);

(d) acid resistant container was filled with sulfuric acid of 1.05 specific gravity;

(e) the positive external current connector and the negative external current connector were connected to the positive and negative terminals of the formation power supply, respectively, and (f) the electrodes were electrochemically formed at 10.3 amperes for 3 hours followed by 11.4 amperes for 9 hours followed by 6 amperes for 12 hours to yield a total level of formation of approximately 200 ampere-hours per pound of positive active material. Cell #1 contained approximately 2.8 liters of sulfuric acid, Cell #2 contained approximately 2.3 liters of sulfuric acid, and Cell #3 contained approximately 1.6 liters of sulfuric acid.

Each cell was then constructed by removing the acid resistant container from said water bath, removing the formation acid, and replacing the formation acid with an equivalent amount of 1.265 specific gravity sulfuric acid without washing and drying the positive and negative electrodes. The cells so produced had a ratio of formed negative active material weight to formed positive active material weight of approximately 0.95:1 and a ratio of total acid weight to total formed active material weight of approximately 4.2:1 in Cell #1, 3.5:1 in Cell #2 and 2.4:1 in Cell #3. The cells were then cycled by discharging at room temperature at a current of 2.5 amperes to a cut-off voltage of 1.50V and recharged via constant current charging to 150% of the capacity removed during the previous discharge. As illustrated in FIG. 9, which shows voltage as a function of total discharge time for each cell, Cell #1 typically discharged for approximately 15 hours to 1.50V, Cell #2 typically discharged for approximately 16 hours to 1.50V and Cell #3 typically discharged for approximately 17 hours to 1.50V. The ampere-hour and watt-hour per pound figures attained with each of the above cell are presented in FIG. 9.

As in the case of Example 1, the shape of the discharge curves for Cells #1, #2 and #3, shown in FIG. 9, are typical of those expected for conventional lead-acid cells in which the plates are juxtaposed side-by-side with the pasted side surfaces of individual positive and negative plates adjacent, and parallel to, one another, and the capacities and efficiencies exhibited by Cells #1, #2 and #3, shown in FIG. 10, are essentially equivalent to the capacities and efficiencies which one skilled in the art would expect from said conventional lead-acid cells containing similar quantities of positive and negative active material.

While presently preferred embodiments of the invention have been shown and described in particularity, the invention may be otherwise embodied within the scope of the appended claims.

What is claimed is:

1. An electrochemical cell comprising
   a. a container;
   b. at least one positive and one negative electrode, each of said positive and negative electrodes comprising a plurality of spaced apart plates, each of said electrodes further having at least one major surface and first and second edges, each of said major surfaces having a composition means to provide associated positive and negative polarity, said positive and negative electrodes being spaced apart from each other at their respective first edges;
   c. an electrolyte positioned with said container and in contact with said compositions;
   d. an associated current collector connected to each of said positive and negative electrodes; and
   e. means for sealing said electrodes and electrolyte within said container having pressure release means.

2. An electrochemical cell comprising
   a. a container;
   b. a least one positive and one negative electrode, each of said positive and negative electrodes comprising a plurality of spaced apart plates made from continuous plate stock, each of said electrodes further having at least one major surface and first and second edges, each of said major surfaces having a composition means to provide associated positive and negative polarity, said positive and negative electrodes being spaced apart from each other at their respective first edges;
   c. an electrolyte positioned with said container and in contact with said compositions;
   d. an associated current collector connected to each of said positive and negative electrodes; and
   e. means for sealing said electrodes and electrolyte within said container having pressure release means.

3. An electrochemical cell comprising
   a. a container;
   b. at least one positive and one negative electrode, each of said positive and negative electrodes comprising a coil wherein each convolution is spaced apart from the adjacent convolution, each of said electrodes further having at least one major surface and first and second edges, each of said major surfaces having a composition means to provide associated positive and negative polarity, said positive and negative electrodes being spaced apart from each other at their respective first edges;
   c. an electrolyte positioned with said container and in contact with said compositions;
   d. an associated current collector connected to each respective second edge of said positive and negative electrodes such that said current collectors of respective electrodes electrically contact from about 15 to 100% of said respective second edges; and
   e. means for sealing said electrodes and electrolyte within said container having pressure release means.

4. An electrochemical cell comprising
   a. a container;
   b. at least one positive and one negative electrode, each of said positive and negative electrodes comprising a coil wherein each convolution is spaced apart from the adjacent convolution, each of said electrodes further having at least one major surface and first and second edges, each of said major surfaces having a composition means to provide associated positive and negative polarity, said positive and negative electrodes being spaced apart from each other at their respective first edges;
   c. an electrolyte positioned with said container and in contact with said compositions, said electrolyte capable of flowing substantially unrestricted in the space between the adjacent convolutions of said coil, there by permitting electron flow between adjacent convolutions;
   d. an associated current collector connected to each respective second edge of said positive and negative electrodes; and
   e. means for sealing said electrodes and electrolyte within said container having pressure release means.

5. An electrochemical cell as set forth in claim 1, wherein said positive electrode is positioned vertically above said negative electrode.

6. An electrochemical cell as set forth in claim 2, wherein said positive electrode is positioned vertically above said negative electrode.

7. An electrochemical cell as set forth in claim 3, wherein said positive electrode is positioned vertically above said negative electrode.

8. An electrochemical cell as set forth in claim 4, wherein said positive electrode is positioned vertically above said negative electrode.

9. An electrochemical cell as set forth in claim 1, wherein said negative electrode is positioned vertically above said positive electrode.

10. An electrochemical cell as set forth in claim 2, wherein said negative electrode is positioned vertically above said positive electrode.

11. An electrochemical cell as set forth in claim 3, wherein said negative electrode is positioned vertically above said positive electrode.

12. An electrochemical cell as set forth in claim 4, wherein said negative electrode is positioned vertically above said positive electrode.

13. An electrochemical cell as set forth in claim 1, 2, 3, 4, 5, 6, 7, 8, 9, 10, 11 or 12, wherein said electrolyte is sulfuric acid.

14. An electrochemical cell as set forth in claims 1, 2, 3, 4, 5, 6, 7, 8, 9, 10, 11 and 12, wherein said cell is lead acid.

15. An electrochemical battery comprising a plurality of cells as set forth in claims 1, 2, 3 or 4, wherein each positive electrode is electrically connected together and each negative electrode is electrically connected together.

16. An electrochemical battery comprising a plurality of alternatively connected cells as set forth in claims 1, 2, 3 or 4, such that the negative electrode of one cell is in electrical contact with the positive electrode of an adjacent cell.

17. An electrochemical cell as set forth in claims 1, 2, 3 or 4, including separator means for separating said positive and negative electrode from each other in spaced apart insulated relationship.

18. An electrochemical cell as set forth in claim 17, wherein said separator means includes a porous separator support positioned on said edges of said positive and negative electrodes.

19. An electrochemical cell as set forth in claims 1, 2, 4, 5, 6, 7 or 8, in which said current collectors of respective electrodes electrically contact from about 15 to 100% of said respective second edges.

20. An electrochemical cell as set forth in claims 1, 2, 3, 4, 5, 6, 7 or 8, in which said electrolyte is free.

21. An electrochemical cell as set forth in claims 1, 2, 3, 4, 5, 6, 7 or 8, in which substantial portion of said electrolyte is absorbed.

22. An electrochemical cell as set forth in claims 1, 2, 3, 4, 5, 6, 7 or 8, in which all of said electrolyte is absorbed.

23. A lead acid battery having a plurality of electrochemical cells as set forth in claims 1, 2, 3, 4, 5, 6, 7, 8, 9, 10, 11 or 12.

24. A lead acid battery as set forth in claim 23, including first and second external electrical contact position said top and bottom of said container, said first contacts being electrically connected to said positive current collector and said second contact being electrically connected to said negative current collector, and wherein a substantial portion of said electrolyte is absorbed.

* * * * *